United States Patent
Kochergin

(10) Patent No.: US 7,760,053 B2
(45) Date of Patent: Jul. 20, 2010

(54) NEGATIVE REFRACTIVE INDEX AND OPTO-MAGNETIC MATERIALS AND METHOD OF FABRICATING SAME

(75) Inventor: Vladimir Kochergin, Westerville, OH (US)

(73) Assignee: Lake Shore Cryotronics, Inc., Westerville, OH (US)

( * ) Notice: Subject to any disclaimer, the term of this patent is extended or adjusted under 35 U.S.C. 154(b) by 1561 days.

(21) Appl. No.: 11/024,038

(22) Filed: Dec. 29, 2004

(65) Prior Publication Data

US 2005/0221128 A1 Oct. 6, 2005

Related U.S. Application Data

(60) Provisional application No. 60/533,215, filed on Dec. 31, 2003.

(51) Int. Cl.
*H01P 3/08* (2006.01)
(52) U.S. Cl. ...................................... 333/208
(58) Field of Classification Search .............. 333/208, 333/99 S; 359/321, 483, 586; 252/585; 343/787
See application file for complete search history.

(56) References Cited

U.S. PATENT DOCUMENTS

| 6,977,767 B2* | 12/2005 | Sarychev et al. ............ 359/321 |
| 7,358,614 B2* | 4/2008 | Snider ....................... 257/776 |
| 7,482,727 B2* | 1/2009 | Bratkovski et al. .......... 310/300 |
| 2006/0131695 A1* | 6/2006 | Kuekes et al. ............... 257/618 |
| 2006/0240681 A1* | 10/2006 | Williams et al. ............ 438/800 |
| 2007/0281156 A1* | 12/2007 | Lieber et al. ................ 428/373 |

OTHER PUBLICATIONS

Podolskiy et al, Resonant light interaction with plasmonic nanowire systems; Journal of Optics A: Pure and Applied Optics (2005).*
Iyer, A. K., and Eleftheriades, G. V., "Negative Refractive Index Metamaterials Supporting 2-D Waves," *IEEE International Microwave Symposium Digest*, (2002), pp. 1067-1070.
Cummer, S.A., "Dynamics of causal beam refractionin negative refractive index materials," *Appl. Phys. Lett.*, 82 (13), pp. 2008-2010 (Mar. 31, 2003).
George, S.M., A.W. Ott and J.W. Klaus, "Surface Chemistry for Atomic Layer Growth," *J. Phys. Chem.* 100, pp. 13121-13131 (1996).

(Continued)

*Primary Examiner*—Robert Pascal
*Assistant Examiner*—Kimberly E Glenn
(74) *Attorney, Agent, or Firm*—Nixon & Vanderhye PC

(57) ABSTRACT

One-dimensional, two-dimensional and three-dimensional negative refractive index (NRI) and/or opto-magnetic materials operating in spectral ranges spanning from the visible to far IR wavelength ranges is disclosed. Said materials are comprised of metal or metal/dielectric wire pairs arranged in a number of sublattices (one for one dimensional material, two for two-dimensional and three or more for three dimensional material), such that in each lattice, said wire pairs are essentially parallel to each other. Such a materials are useful and practical in obtaining previously unachievable important optical functions in these spectral ranges. Such optical properties are highly desired for many applications. A practical means of manufacture that is compatible with cost-effective and large-scale production methods is also provided.

21 Claims, 7 Drawing Sheets

OTHER PUBLICATIONS

Grbic, A., and Eleftheriades, G. V., "Experimental verification of backward-wave radiation from a negative refractive index metamaterial," *J. Appl. Phys.*, (2002) 92 (10), pp. 5930-5935 (Nov. 15, 2002).

Lamb, H., "On group-velocity," in *Proc. London Math. Soc.*, vol. 1, 1904, pp. 473-479.

Liu, L., et al., *J. Appl. Phys.*, (2002) 92 (9), 5560-5565.

Mandel'shtam, L. I., "Lectures On Certain Problems Of Oscillation Theory: Lecture 4", in *Polnoe Sobraniye Trudov*. Leningrad: Izdat, 1950, vol. 5, Akad. Nauk SSSR, pp. 461-467.

L. I. Mandel'shtam, *Zh. Eksp. Teor. Fiz.*, vol. 15, pp. 475-478, 1945.

Panina, L.V., et al., "Optomagnetic composite medium with conducting nanoelements," *Phys. Rev. B*, 66, p. 155411-1 to 155411-17 (2002).

Pendry, J. B., et al.,"Magnetism from Conductors and Enhanced Nonlinear Phenomena," *IEEE Trans. Microwave Theory and Techniques*, (1999) vol. 47, No. 11, pp. 2075-2084.

Pendry, J.B., "Negative Refraction Makes A Perfect Lens," *Phys. Rev. Lett.* 85 (18), pp. 3966-3969 (2000).

Pocklington, H. C., *Nature*, vol. 71, pp. 607-608, 1905.

Podolskiy, V., et al. "Plasmon Modes in Metal Nanowires and Left-Handed Materials," *J. Nonlinear Optical Physics & Materials*, (2002) 11 (1), 65-74 (2002).

Podolskiy, V., et al., "Plasmon modes and negative refraction in metal nanowire composites," vol. 11, No. 7, pp. 735-745 (Apr. 7, 2003).

Ritala, M., and M. Leskela, in: H. S. Nalwa, (Ed), Handbook of Thin Film Materials, Academic Press, San Diego, 2001, vol. 1, Chapter 2, p. 103.

Shelby, R. A., et al., "Experimental Verification of a Negative Index of Refraction," *Science*, (2001) 292, 77-79.

Shen, J.T., and P.M. Platzman, "Near field imaging with negative dielectric constant lenses," *Appl. Phys. Lett.*, 80 (18), p. 3286-3288 (May 2002).

Smith, D. R., et al., "Composite Medium with Simultaneously Negative Permeability and Permittivity," *Phys. Rev. Lett.*, (2000) 84 (18), pp. 4184-4187.

Sneh, O., "Strategies for high-productivity ALD," *Solid State Technology*, Nov. 2003, pp. 22-24.

Sneh, R.B. Clark-Phelps, A.R. Londergan, J.L. Winkler and T.E. Seidel, "Thin film atomic layer depositionequipment for semiconductor processing," *Thin Solid Films*, 402/1-2 (2002) pp. 248-261.

Veselago, V.G., "The Electrodynamics of Substances with Simultaneously Negative Values of $\epsilon$ and $\mu$," *Sov. Phys. Usp.*, vol. 10, No. 4, p. 509-514 (1968) [Russian Version: Veselago, V. G., "The electrodynamics of substances with simultaneously negative values of eps and mu," *Usp. Fiz. Nauk*, vol. 92, pp. 517-526, 1967, Soviet Phys. Usp. 10, 509 (1968) Usp. Fiz. Nauk 92, 517-526 (1967).].

Ziolkowski, R.W., "Wave progagation in media having negative p;ermittivity and permeability," *Phys. Rev. E.*, vol. 64, p. 056625 (2001).

\* cited by examiner

NEGATIVE REFRACTIVE INDEX AND OPTO-MAGNETIC MATERIALS AND METHOD OF FABRICATING SAME

CROSS-REFERENCES TO RELATED APPLICATIONS

This application claims the benefit of provisional application 60/533,215 filed Dec. 31, 2003, incorporated herein by reference.

STATEMENT REGARDING FEDERALLY SPONSORED RESEARCH OR DEVELOPMENT

Not applicable.

FIELD

The technology herein relates to methods of fabricating negative refractive index and opto-magnetic materials, and more specifically to methods for fabricating negative refractive index and opto-magnetic materials from artificially structured composites based on porous semiconductors. Further, exemplary non-limiting illustrative implementations provide isotropic structures exhibiting negative refractive index and/or opto-magnetic response.

BACKGROUND AND SUMMARY

Optical lenses have for centuries been one of the scientist's major tools. The majority of prior art lenses operate by either focusing light using curved surfaces or by means of diffraction on a surface corrugation (diffractive lenses). The limitations of both types of lenses are well known. No lens can focus light onto an area smaller than a wavelength squared (in the material). However, recently in J. B. Pendry, Negative Refraction Makes A Perfect Lens, *Phys. Rev. Lett.* 85 (18), 2000, p. 3966, it was theoretically predicted that a slab of material exhibiting a negative refractive index (also known as a left-handed material) could provide a resolution significantly exceeding that of any lens designs known to date. Lenses that might be designed after Pendry's theory have become known as "perfect lenses".

Even though later it was shown (see, for example, [R. W. Ziolkowski, *Phys. Rev. E.*, 64, p. 056625 (2001)]) that Pendry made some errors in his original analysis [J. B. Pendry, Negative Refraction Makes A Perfect Lens, *Phys. Rev. Lett.* 85 (18), 2000, p. 3966], Pendry's conclusion still holds: A negative refractive index (NRI) flat slab indeed can act as a lens having subwavelength resolution (see, for example, [J. T. Shen and P. M. Platzman, *Appl. Phys. Lett.*, 80 (18), p. 3286, May 2002; S. A. Cummer, *Appl. Phys. Lett.*, 82 (10), p. 1503, March 2003]). The basis of such a counterintuitive effect is that an NRI slab focuses not only propagating waves (as does a normal lens) but also evanescent waves. The exemplary illustrative FIG. 1 drawing shows schematically the difference in transmission of the image through a "normal" material slab (i.e. with $n(\omega)>0$) (FIG. 1a) and an NRI material slab (FIG. 1b).

NRI material does not exist in nature, so only artificial materials may exhibit a refractive index $n(\omega)<0$. In other terms, the NRI material must exhibit both negative magnetic permeability and negative dielectric permittivity for at least a large enough wavelength range: $\in(\omega)<0, \mu(\omega)<0$. Such materials were predicted and theoretically analyzed by Veselago [V. G. Veselago, Sov. Phys. Usp., 10, p. 509 (1968)]. However, it took about 30 years before Pendry and coworkers proposed any practical designs for a material that would exhibit NRI [Pendry, J. B., et al., *IEEE Trans. Microwave Theory and Technology*, (1999) 47 (11)]. In this paper, Pendry predicted that an array composed of conducting, split ring resonators (SRRs) (as shown in FIG. 2), could mimic the response of a magnetic material and, in particular, would have a well-defined region of negative permeability over a band of frequencies in the microwave regime. Pendry's SRR array was realized and experimentally tested by David Smith, et al., [Smith, D. R., et al., *Phys. Rev. Lett.*, (2000) 84 (18), 4184-4187]. Negative refraction of microwaves incident on the array was demonstrated [Shelby, R. A., et al., *Science*, (2001) 292, 77-79].

Although it is widely believed that the first study of such media was done by Veselago [V. G. Veselago, *Usp. Fiz. Nauk*, vol. 92, pp. 517-526, 1967], it is not strictly true. For example, Mandel'shtam as early as in 1945 [L. I. Mandel'shtam, "Lectures On Certain Problems Of Oscillation Theory: Lecture 4", in *Polnoe Sobraniye Trudov*. Leningrad: Izdat, 1950, vol. 5, Akad. Nauk SSSR, pp. 461-467; L. I. Mandel'shtam, *Zh. Eksp. Teor. Fiz.*, vol. 15, pp. 475-478, 1945] referred to a 1904 paper of Lamb [H. Lamb, "On group-velocity," in *Proc. London Math. Soc.*, vol. 1, 1904, pp. 473-479], who may have been the first person to suggest the existence of backward waves (his examples involved mechanical systems rather than electromagnetic waves). In 1905, Pocklington [H. C. Pocklington, *Nature*, vol. 71, pp. 607-608, 1905] showed that in a specific backward-wave medium, a suddenly activated source produces a wave whose group velocity is directed away from the source, while its phase velocity moves toward the source.

In [Podolskiy, V., et al., *J. Nonlinear Optical Physics & Materials*, (2002) 11 (1), 65-74] it was suggested theoretically that certain nanowire composites would be a viable basis for thin-film negative index materials (NIMs) for the visible and near infrared (IR) spectral ranges. Numerical simulations showed that plasmon resonance modes were created around distributed dipole needles arranged in parallel pairs [Podolskiy, V., et al., *J. Nonlinear Optical Physics & Materials*, (2002) 11 (1), 65-74]. Currents induced in the wire pairs contribute to the resonant conditions, which in turn account for the negative refractive index. Independently, the same (or very similar) idea was proposed by Panina et al. [L. V. Panina et al., *Phys. Rev. B*, 66, p. 155411 (2002)]. FIG. 3a gives a schematic drawing of such a material, while FIG. 3b shows the spectral dependences of the real and imaginary parts of the effective dielectric permittivity and magnetic permeability that were theoretically predicted by Panina, et al. These predictions apply for the electromagnetic wave propagation along the k direction, shown in FIG. 3a, for a material having the polarization such as the electric and magnetic field vectors of the electromagnetic wave coincide with the E and H directions showed in FIG. 3a. However, in none of these disclosures the possible method of fabrication of such a material has been proposed. The main problem with optical and IR frequencies is to create a material that possesses negative magnetic permeability.

NRI materials hold enormous promise for many applications. In addition to imaging devices, where the applications are obvious, such materials would enable many other applications. In the microwave region (and potentially in optical spectral region as well) for example, a medium that focuses waves when other materials would disperse them, and vice versa, will be useful in improving delay lines, couplers, duplexers, antennas, and filters. T. Itoh et al, have theoretically demonstrated the possibility of a new, highly compact forward-wave directional couplers based on artificial, left-hand transmission lines with microstrip components [Liu, L., et al., *J. Appl. Phys.*, (2002) 92 (9), 5560-5565]. Eleftheriades [Ayer, A. K., and Eleftheriades, G. V., *IEEE International Microwave Symposium Digest*, (2002), pp. 1067-1070; Grbic, A., and Eleftheriades, G. V., *J. Appl. Phys.*, (2002) 92 (10), pp. 5930-5935] claimed that artificial constructs of this kind (also called metamaterials) offer large operating bandwidths and, being planar, would readily support two-dimensional wave propagation, making them highly suitable for RF/microwave devices and circuit applications. In particular, opportunities exist for compact devices capable of beam steering and microwave focusing, as well as solid-state filters and miniature 'backward' antennas.

Many believe that prospects for NRI materials are greatest in the IR/visible region. Such materials, if successfully created, will enable new types of band-pass filters, modulators, antennas, and other light manipulating devices. Shalaev [Podolskiy, V., et al., *J. Nonlinear Optical Physics & Materials*, (2002) 11 (1), 65-74] predicted that the possibilities for nonlinear waves and devices like optical solitons could revolutionize optoelectronics. NRI materials could hugely improve technologies for biomedical imaging and nanolithography. Opto-magnetic material (as opposed to normal magneto-optic materials) is a term introduced by Panina [L. V. Panina et al., *Phys. Rev. B*, 66, p. 155411 (2002)]), meaning a material exhibiting magnetic permeability at optical frequencies. A material exhibiting a degree of permeability at optical frequencies, but not enough to create a negative refractive index, is predicted to have applications in a new generation of magnetic field and electrical current sensors and in tunable optical elements (such as tunable filters, modulators, lasers, etc.). Despite numerous theoretical studies devoted to NRI materials during the last several years, no such materials have been manufactured for optical and IR wavelengths.

It is an object of the present exemplary illustrative non-limiting implementation to provide the practical design of NRI materials for the visible and/or infrared spectral range that will exhibit negative values of the refractive index at least for some directions of light propagation through said material for at least some polarization states of said light, over at least some interval of wavelengths of said light. It is a further object of the present exemplary illustrative non-limiting implementation to provide the practical design of the NRI that would exhibit negative values of the refractive index for any direction of light propagation through said material for at least some polarization states of said light over at least some wavelength range. It is another object of the present exemplary illustrative non-limiting implementation to provide a practical design of NRI material that would exhibit a negative refractive index for at least some directions of light propagation for any polarization state of said light over at least some wavelength range. It is a further object of the present exemplary illustrative non-limiting implementation to provide a practical design of the NRI material that would exhibit a negative refractive index for any directions of light propagation for any polarization state of said light over at least some wavelength range. Further, it is an object of the present exemplary illustrative non-limiting implementation to provide a practical design of the opto-magnetic material that will exhibit magnetic permeability values substantially different from unity for at least some directions of light propagation through the material, for at least some polarization states of said light over at least some wavelength interval within the infrared wavelength range. It is also an object of the present exemplary illustrative non-limiting implementation to provide several practical methods of fabrication of NRI and/or opto-magnetic materials of present exemplary illustrative non-limiting implementation.

According to the first exemplary illustrative non-limiting implementation, a negative refractive index material exhibiting negative refraction for at least some directions of light propagation through said material, for at least some polarization state of said light over at least some wavelength range within the IR can be realized by creating a structure consisting of a several lattices of wire pairs such that in each of these said metal wire lattices, wire pairs are "aligned" such that both the metal wire directions and the planes of wire pairs are essentially parallel to each other, while the wire pairs belonging to different sublattices have either wire directions or planes of wires not parallel. The metal wire pairs in each of said sublattices can be either spatially ordered or disordered (i.e., random). The principle difference between the NRI, or opto-magnetic material of the present exemplary illustrative non-limiting implementation and the prior art material, as disclosed, for example, in [Podolskiy, V., et al., *J. Nonlinear Optical Physics & Materials*, (2002) 11 (1), 65-74] and [L. V. Panina et al., *Phys. Rev. B*, 66, p. 155411 (2002)], is that in prior art material the wire pairs were distributed completely randomly either in the plane (two-dimensional case) or in space (three-dimensional case), while in the material of the present exemplary illustrative non-limiting implementation the "randomness" of the material is substantially reduced, which can lead (as will be shown later) to greatly improved performance of the material.

According to the first aspect of the first exemplary implementation of the present exemplary illustrative non-limiting implementation, the NRI and/or opto-magnetic material comprises the film having a thickness in the range of 1 µm to 1000 µm and consisting of a single lattice of metal wire pairs extended perpendicular to the film's plane. We shall denote such a material as 1D (one dimensional) material in the future discussion. Such a material will have strongly anisotropic dielectric permittivity and magnetic permeability tensors at wavelengths around resonances in the metal wire pairs. It can exhibit negative refractive index only for electromagnetic waves propagating in the plane of the film in the direction perpendicular to the plane of the wire pairs and in a small cone of angles around this direction. This will occur over some wavelength range and the polarization range of the electromagnetic wave FOR which the electric field vector of said wave is parallel to the wire direction (i.e, perpendicular to the film plane transverse magnetic (TM) polarization). This type of anisotropy belongs to the class of materials called "indefinite" materials (since different elements of dielectric permittivity and magnetic permeability tensors will have different signs). Further, the diameters of the wires can optionally be coherently modulated along the film depth so the effective refractive index of the film will be modulated across the film depth. In this manner, a waveguide structure can be created in the plane of the film, which can have a number of important applications. Still further, such a material would exhibit values of magnetic permeability substantially different from unity in some part of the IR spectral range for all the electromagnetic waves propagating through said material in directions lying in the plane of the wire pair plane and having such a polarization state that the magnetic field vector of the electromagnetic wave is directed perpendicular to the planes of wire pair. This will allow the material be used as an opto-magnetic composite for a number of directions, which is lead to applications in light modulators and sensing of physical parameters.

According to the second aspect of the first exemplary implementation of the present exemplary illustrative non-limiting implementation, the NRI and/or opto-magnetic material comprises the film having a thickness in the range of 1 µm to 1000 µm consisting of two lattices of metal wire pairs extended perpendicular to the film's plane, and additionally the planes of wire pairs in these lattices are perpendicular to each other. Such a material is denoted a 2D (two dimensional) material in the succeeding discussion. Such a material will still have strongly anisotropic dielectric permittivity and magnetic permeability tensors at the wavelengths around resonances in metal wire pairs, but the anisotropy will be substantially reduced with respect to the 1D material. It can exhibit negative refractive index for electromagnetic waves propagating in any direction in the plane of the film for the polarization of said electromagnetic wave such that the electric field vector is directed perpendicular to the film plane (i.e., the TM polarization, as in 1D case). This type of anisotropy also belongs to the class of materials called "indefinite" materials (since different elements of dielectric permittivity and magnetic permeability tensors will have different signs), but, unlike 1D case where in the coordinate system where dielectric permittivity and magnetic permeability tensors are diagonalizable, it has one negative and two positive tensor elements, 2D material would exhibit two negative and one positive tensor elements. Further, the diameters of the wires can be coherently modulated along the film depth so the effective refractive index of the film will be modulated across the film depth. In this way, a waveguide structure can be created in the plane of the film. For light with such a waveguide mode, the refractive index of the core and/or cladding would be negative for any direction of propagation. Such a structure can have a number of important applications. Further, such a material would exhibit values of magnetic permeability substantially different from unity in some part of the IR spectral range for all the electromagnetic waves propagating through said material in any directions having a polarization state such that the magnetic field vector of the electromagnetic wave is parallel to the plane of the film (i.e., TM or p-polarized waves). Alternatively, such a material would exhibit values of magnetic permeability substantially different from unity in some part of the IR spectral range for all polarizations of electromagnetic waves incident within some cone of angles around the normal incidence direction. This would allow the material to be used as an opto-magnetic composite for a number of directions, which is predicted to find applications in light modulators and in the sensing of physical parameters.

According to a third aspect of the first exemplary illustrative non-limiting implementation, the NRI and/or opto-magnetic material comprises a film having a thickness in the range of 1 µm to 2000 µm consisting of three or more lattices of metal wire pairs, at least one of them extended at some angle with respect to the film's plane. Such a material is denoted as 3D (three dimensional) material in the succeeding discussion, despite the fact that there may be more than three lattices of metal wire pairs. Depending on configuration, such a material will either exhibit weak uniaxial or biaxial anisotropy of the dielectric permittivity and magnetic permeability, or will be completely isotropic at the wavelengths around resonances in the metal wire pairs. 3D material can exhibit negative refractive index for the electromagnetic waves propagating in any direction with respect to the film for any polarization of said electromagnetic wave at least over some wavelength band within the IR range. However, the values of the refractive index can be different in different propagation directions or for different polarizations, while all being negative at some spectral range. Still further, such a material would exhibit values of magnetic permeability substantially different from unity in some part of the IR spectral range for all the polarizations of electromagnetic waves propagating through said material in any direction, i.e., such a material will be an isotropic or omnidirectional opto-magnetic material.

According to the second exemplary illustrative non-limiting implementation, the negative refractive index material of the first exemplary illustrative non-limiting implementation can be realized as a assembly of wire pair lattices, wherein said wires are composed of a multilayered, metal-dielectric structure. The structure of each wire in such a material will be identical and composed of layers of metal(s) and dielectrics. Such a structure can provide better opportunity for engineering control over the shape and spectral position of dielectric permittivity and magnetic permeability resonances by means of better control over the plasmon modes. Particularly, the quality of the resonances can be substantially improved by creating so-called anti-symmetric plasmon modes in the wires, which is known to provide lower losses and a higher quality of resonances. This, in turn, will lead to the increase of the absolute value of electric polarizability and magnetic susceptibility of each wire pair and through that to lower values of dielectric permittivity and magnetic permeability of the NRI and/or opto-magnetic material of the present exemplary illustrative non-limiting implementation. It should be noted that such a wire structure would considerably improve the NRI and/or opto-magnetic material over prior art designs as described in, for example, in [Podolskiy, V., et al., *J. Nonlinear Optical Physics & Materials*, (2002) 11 (1), 65-74] and [L. V. Panina et al., *Phys. Rev. B*, 66, p. 155411 (2002)]. Further, said wire pairs can be embedded in the semiconductor or dielectric host. In such a case it is necessary that said semiconductor and/or dielectric material should be sufficiently transparent at the wavelengths of permittivity and permeability resonances of said wire pair structures. It is also desirable that the refractive index of refraction of said host material should be low enough to be able to achieve negative values of the refractive index of the film. Alternatively, the host material can be a semiconductor or semiconductor/dielectric structural material with as low a refractive index as can be achieved artificially by means of the modification of the material structure.

According to the third exemplary illustrative non-limiting implementation, a method is provided for the fabrication of the NRI and/or opto-magnetic material of the first two illustrative implementations. According to one non-limiting illustrative exemplary arrangement, a 1D or 2D material can be fabricated from a semiconductor wafer by forming a porous semiconductor structure (where pores are straight and non-branching) by means of electrochemical or photoelectrochemical etching technique with the subsequent filling of said pores with metal or by the coating of the pore walls by a metal-dielectric multilayer. Pore cross sections can be modulated at least along part of their depths while other parts are left unmodulated, or the entire depths can be modulated. With such a method, NRI and/or opto-magnetic material not only can be fabricated for scientific research purposes, but also can be fabricated relatively simply and inexpensively, leading to more immediate commercial applications.

Said metal wires dimensions and positions in the film will be defined by pore sizes and positions. Such a structure can be fabricated, for example, by forming a layer of porous semiconductor by means of electrochemical etching of a single crystal semiconductor wafer as deeply as necessary. Pores formed by such a process will serve as hosts for the metal or metal-dielectric structure of said wires, while the semiconductor host will serve as the medium in which said wires are embedded. Modulation of the cross sections of the wires can be achieved by means of the modulation of the pore diameters along their depths by modulating the electrochemical etching parameters during the etching process. For example, the parameters available for modulation include the current density, illumination intensity or others known to those skilled in the art. Said semiconductor material can be silicon (P-type doped or N-type doped), gallium arsenide, indium phosphide or any other material shown to form straight pores during electrochemical etching in a suitable electrolyte and under suitable conditions. The pore filling or covering of the pore walls by metal or metal/dielectric multilayers can be achieved by electroplating techniques or by a Chemical Vapor Deposition technique (preferably by the Atomic Layer Deposition variation of CVD), or by any other deposition or growth process known to those skilled in the art, such as sputtering or evaporation.

This specification also discloses exemplary, non-limiting illustrative methods for manufacturing of NRI and/or opto-magnetic material. According to the one aspect of the present exemplary implementation, NRI and/or opto-magnetic material of the first exemplary implementation can be produced by:

selecting a semiconductor wafer having first and second surfaces wherein said first surface is substantially flat,
    producing starting points for etching on the first surface of the semiconductor wafer,
    producing a porous layer in said wafer starting from the first surface, and
    filling the pores with at least one layer of appropriate metal.

The porous layer can be formed by means of electrochemical etching of said semiconductor wafer in acidic electrolyte. The etching method may include connecting the substrate as an electrode, contacting the first surface of the substrate with an electrolyte, setting a current density (or voltage) that will influence etching erosion, and continuing the etching to form said pores extending to a desired depth perpendicularly to said first surface (as would be desired for the 1D or 2D material of the first exemplary illustrative non-limiting implementation) or at some angle defined by the crystallographic orientation of the semiconductor wafer (as would be needed for the 3D material of the first exemplary illustrative non-limiting implementation). Said semiconductor wafer can be, but is not limited to, a silicon wafer. Etching starting points (commonly called "etch pits") can be formed as depressions on the first surface of said wafer to control the locations of the pores to be formed in the electrochemical etching process. Said etch pits can be formed by means of applying a photoresist layer on the first surface of the semiconductor wafer, photolithographically defining the pattern of openings and chemically or reactively ion etching the etch pits through said openings. Alternatively, said etch pits can be formed by depositing (by means of chemical or physical vapor deposition, thermal oxidation, epitaxial growth, sol-gel coating or any other technique known to those skilled in the art) a material layer with different chemical properties than that of the substrate, applying a photoresist layer on the top of said material, photolithographically defining the pattern of openings in the photoresist layer, transferring said patterns into said layer by means of chemical or reactive ion etching and transforming the resultant pattern into a corresponding etch pit pattern by means of chemical or reactive ion etching. Said layer of material with different chemical properties than that of the substrate wafer may then be removed by means of chemical etching, reactive ion etching or any other method known to those skilled in the art.

More specifically, said semiconductor wafer can be an n-doped, <100> orientated silicon wafer. In this case, the electrolyte can be an HF-based aqueous acidic electrolyte. Alternatively, the electrolyte can be an HF-based organic electrolyte. Alternatively, said semiconductor wafer can be a p-doped, <100> orientated silicon wafer. The electrolyte in this case may be HF-based organic electrolyte. The electrolyte may contain hydrofluoric acid in a range of 1% to 50%, but preferably 2 to 10% by volume. A second surface of the substrate wafer that lies opposite the first surface may be illuminated during electrochemical etching. The electrolyte may additionally contain an oxidation agent, a hydrogen reducing agent (e.g., selected from the group of chemicals consisting of mono functional alkyl alcohols, tri functional alkyl alcohols), a viscosity increasing agent, a conductivity-modifying agent, and/or other organic additives. Electrochemical process parameters such as current density, applied voltage, and illumination intensity can be kept constant during the pore formation process. Alternatively, said electrochemical process parameters can vary in a predetermined fashion during the pore growth process to provide the pores with needed modulation in cross-sections, or may be varied monotonically with pore depth to keep the pore diameter constant. As a further alternative, said semiconductor wafer can be of material chosen from the full possible range of alloys and compounds of zinc, cadmium, mercury, silicon, germanium, tin, lead, aluminum, gallium, indium, bismuth, nitrogen, oxygen, phosphorus, arsenic, antimony, sulfur, selenium and tellurium. The electrolyte may be an acidic electrolyte with the acid suitably chosen for pore formation in the particular semiconductor material.

Said filling of the pores with appropriate metal can be done by means of the electroplating process. It should be noted that by electroplating process the metal "multilayer" can be formed by changing the composition of the electrolyte during electroplating process and/or changing the electroplating process parameters, e.g. applied current density. The metal used to fill the pores can be Au, Ag, Al, Cu, Ta, Ti, Co, Ni, Fe, Pt or it can be a metal alloy. In an electroplating process, complete voidless filling of the pores and formation of a metal axial "multilayer" is possible only if the pores are filled from the bottom up. This nonlimiting, illustrative method of NRI and/or opto-magnetic material fabrication is possible only if no insulating material or layer covers the pore walls. Alternatively, the pores can be substantially filled by an electro-less plating process. In the case of electroless plating, no metal "multilayer" formation is possible from the same chemical bath. Other metal deposition processes (such as various modifications of Chemical Vapor Deposition techniques) are also possible. It should also be noted that, after both the electroplating and electroless-plating processes, some excessive metal could be formed on the first surface of the semiconductor wafer, which may degrade the performance of the NRI and/or opto-magnetic material. Said excessive metal can be removed from the first surface of the semiconductor wafer by a chemical-mechanical polishing technique or any other removal technique known to those skilled in the art.

According to a further illustrative non-limiting method of manufacturing, an NRI and/or opto-magnetic material of the first exemplary implementation of the present exemplary illustrative non-limiting implementation can be produced by:

starting with a semiconductor wafer having first and second surfaces, wherein said first surface is substantially flat,
    Producing etch starting points on the first surface of the semiconductor wafer,
    producing a porous layer in said wafer starting from the first surface,
    removing the un-etched part of said wafer at the distal ends of the pores, and filling the pores with metal.

The porous layer can be formed as was described in relation to illustrative methods of manufacturing an NRI and/or opto-magnetic material given previously.

Removal of the unetched part of the wafer can be performed by means of grinding, polishing, chemical-mechanical polishing, chemical etching, reactive ion etching or any other method known to those skilled in the art.

Said filling of the pores with appropriate metal can be done by means of an electroplating process. It should be noted that, by means of an electroplating process, an axial metal "multilayer" can be formed by changing the composition of the electrolyte during the electroplating process and/or changing the electroplating process parameters, e.g., the applied current density. The metal filling the pores can be Au, Ag, Al, Cu, Ta, Ti, Co, Ni, Fe, Pt or In, or it can be an alloy of any combination of these metals. In an electroplating process, complete voidless filling of the pores and formation of an axial metal "multilayer" is possible only if the pores are filled from the bottom up. For this nonlimiting, illustrative method of NRI and/or opto-magnetic material, fabrication is possible even if the pore walls are covered by insulating material since the pores are open from both ends and the current can pass through the electrolyte filling the pores during the plating process. Alternatively, the pores can be filled by an electroless plating process. In this case, no metal "multilayer" formation is possible. Other metal deposition processes (such as various modifications of Chemical Vapor Deposition) are also possible. It should be also noted that after both the electroplating and electroless-plating processes, some excessive metal can be formed on the first and/or second surfaces of the semiconductor wafer which may degrade the performance of the NRI and/or opto-magnetic material. Said excessive metal can be removed from the first surface of the semiconductor wafer by a chemical-mechanical polishing technique or any other removal technique known to those skilled in the art.

According to a further illustrative non-limiting method of manufacturing a NRI and/or opto-magnetic material of the second exemplary implementation of the present exemplary illustrative non-limiting implementation can be produced by:

starting with a semiconductor wafer having first and second surfaces, wherein said first surface is substantially flat, Producing etch starting points on the first surface of the semiconductor wafer, producing a porous layer in said wafer starting from the first surface, coating the pore walls with metal-dielectric multilayer.

The porous layer can be formed as was described in relation to illustrative methods of manufacturing an NRI and/or opto-magnetic material given previously.

Said coating of the pore walls with metal-dielectric multilayer structure can be done by means of the different variations of a Chemical Vapor Deposition (CVD) technique or by means of a combination of thermal oxidation with a CVD technique. Particularly, a combination of thermal oxidation with Metallo-Organic CVD (MOCVD) would be the technique of choice if the desired metal-dielectric multilayer by design should consist of just two layers, an insulating dielectric on the pore walls and a plasmon-supportive metal covering the dielectric. If more than two layers need to be employed (such as dielectric-metal-dielectric, or even more complex structure with several layers of metal and dielectric employed), Atomic Layer Deposition (ALD) would be the technique of choice to be used since it is better suited for uniform, pinhole-free covering of high aspect-ratio structures with multilayers, with excellent control over each layer thickness ([M. Ritala and M. Leskela, in: H. S. Nalwa, (Ed), Handbook of Thin Film Materials, Academic Press, San Diego, 2001, Vol. 1, Chapter 2, p 103], [S. M. George, A. W. Ott and J. W. Klaus, J. Phys. Chem. 100 (1996) 13121], [O. Sneh, R. B. Clark-Phelps, A. R. Londergan, J. L. Winkler and T. E. Seidel, Thin Solid Films, 402/1-2 (2002) 248], [O. Sneh, Solid State Technology, November 2003, p. 22]).

According to another illustrative non-limiting method of manufacture, an NRI and/or opto-magnetic material of the second exemplary implementation of the present exemplary illustrative non-limiting implementation can be produced by:

starting with a semiconductor wafer having first and second surfaces, wherein said first surface is substantially flat, Producing an etching starting points on the first surface of the semiconductor wafer, producing a porous layer in said wafer starting from the first surface, removing the unetched part of said wafer at the ends of the pores, and coating the pore walls with metal-dielectric multilayer.

All the fabrication steps can be performed as was described in relation to previously described illustrative methods of manufacturing an NRI and/or opto-magnetic material. However, such a sequence of steps might be advantageous for the case of the NRI and/or opto-magnetic material with a high number of layers in the "multilayer" coating of the pore walls, since having pores open on both sides makes gas flow (i.e., reagent flow in the CVD techniques) simpler. In the case of MOCVD used as a deposition technique, this would open the potential for fabricating deeper pore structures (i.e. thicker films of NRI and/or opto-magnetic material), while in the case of ALD it would shorten the processing time and will potentially lower consumption of chemicals.

BRIEF DESCRIPTION OF THE DRAWINGS

These and other features and advantages provided in accordance with the presently preferred, exemplary, non-limiting illustrative implementations will be better and more completely understood by referring to the following detailed description in connection with the drawings, of which.

DETAILED DESCRIPTION

Figure 1A:
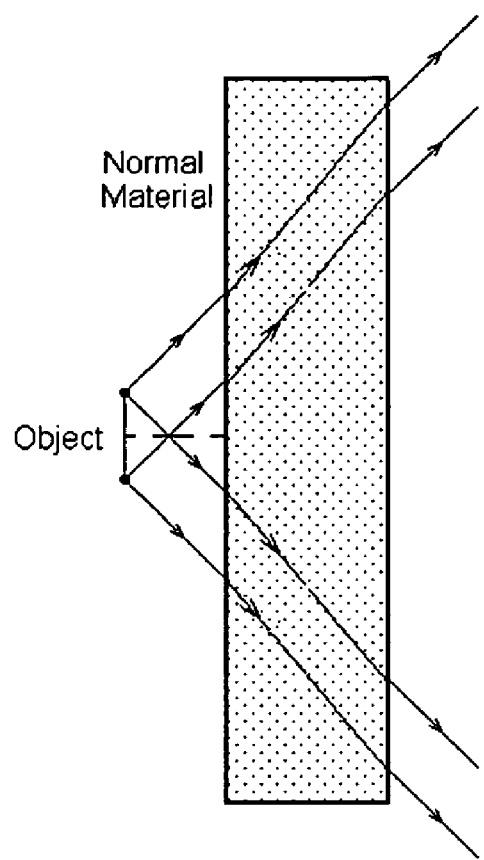
FIGS. 1a-1b are schematic exemplary views illustrating the transmission of an optical image through a plane-parallel plate of a positive refractive index material (1a) and a negative refractive index (NRI) material (1b)
Figure 1B:
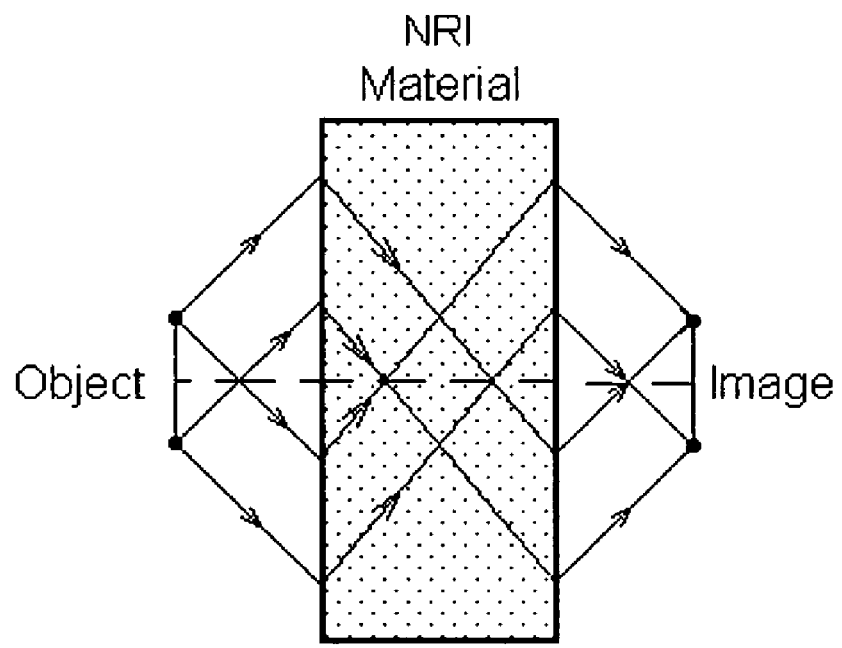
Figure 2:
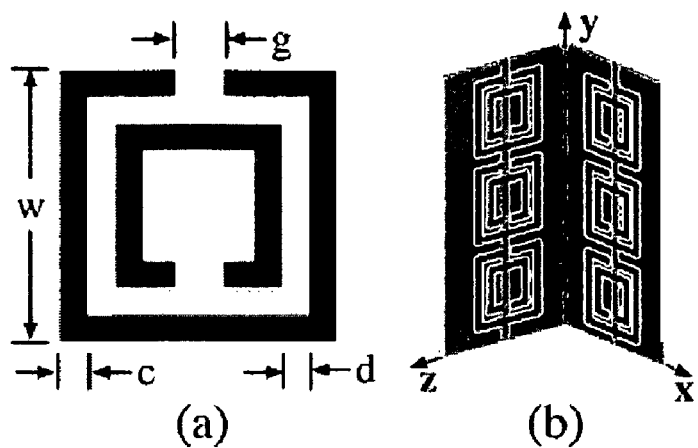
FIGS. 2a-2b are schematic illustrative views of exemplary prior art negative refractive index material assembled by Smith and coworkers comprising an array of split ring resonators and wire elements with dimensions on the order of centimeters for wavelengths considerably longer than in IR range.
Figure 3A:
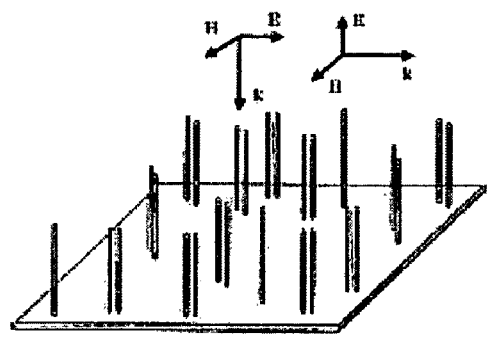
FIG. 3a is a diagrammatic illustrative drawing of an exemplary prior art composite medium with magnetic permeability resonance at optical frequencies.
Figure 3B:
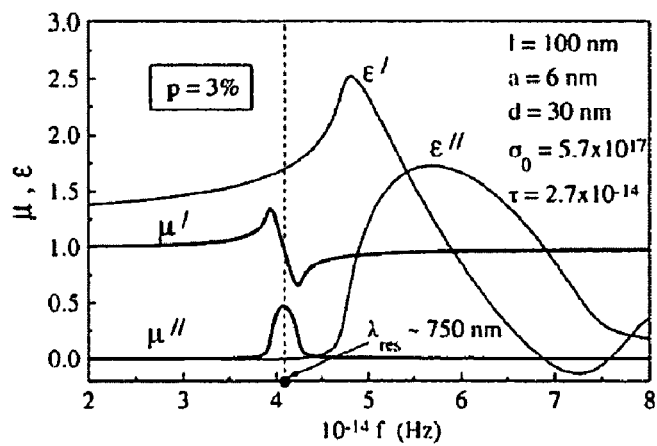
FIG. 3b shows illustrative exemplary predicted frequency dependences of the effective permittivity and permeability of the structure of FIG. 3a for volume concentration of metal of about 3%.

According to the first exemplary illustrative non-limiting implementation, a negative refractive index material exhibiting negative refraction for at least some directions of light propagation through said material, for at least some polarization state of said light, over at least some wavelength range within the IR spectrum can be realized by creating a structure consisting of a several lattices of wire pairs such that in each of these lattices, said metal wire pairs are "aligned" such that both the metal wire directions and the planes of wire pairs are essentially parallel to each other, while the wire pairs belonging to different sublattices have either wire directions or planes of wires not parallel. The metal wire pairs in each of said sublattices can be either spatially ordered or disordered (i.e., random).

The properties of such material can be understood from the following theoretical formalism: For the composite material of the present exemplary illustrative non-limiting implementation, the effective dielectric permittivity and effective magnetic permeability tensors are introduced: $\hat{\epsilon}^{(eff)} \hat{\mu}^{(eff)}$ according to the following relations: $\hat{\epsilon}^{(eff)}E = \epsilon_B E + P, \hat{\beta}^{(eff)}H = H + M$, where E is the electric field vector of the incident electromagnetic wave, H is the magnetic field vector, P is the electrical polarization of the composite, M is the magnetization of the composite and $\epsilon_B$ is the bulk dielectric permittivity of the bulk material in which the wires are embedded (which is can be assumed to be isotropic).

For the sake of generality, consider the material where the wire pairs are arranged into N sublattices. The positions of the wire pairs in each sublattice are still assumed to be random. Assuming the wire pairs are sufficiently separated from each other, the polarization and magnetization of the composite are both equal to the vector sums of the polarizations and magnetizations of each sublattice considered separately:

$$P = \sum_{i=1}^{N} \vec{P}^{(i)}, M = \sum_{i=1}^{N} \vec{M}^{(i)}$$

where $P^{(i)}$ and $M^{(i)}$ is the polarization and magnetization of the $i^{th}$ sublattice respectively. In the coordinate system associated with the $i^{th}$ lattice, both the electrical and magnetic polarizations of the lattice are assumed to be linear isotropic functions of the local electric and magnetic fields of the electromagnetic waves: $P^{(i)} = N^{(i)} \alpha^{(i)} E_L^{(i)}$, $M^{(i)} = N^{(i)} \chi^{(i)} H_L^{(i)}$, where $N^{(i)}$ is the density of the metal-filled pore pairs of an $i^{th}$ sublattice $\alpha^{(i)}$ is the electrical polarizability of each metal-filled pore pair in $i^{th}$ sublattice, $E_L^{(i)}$ is the local electric field "seen" by each metal-filled pore pair in $i^{th}$ sublattice, $\chi^{(i)}$ is the susceptibility of each metal-filled pore pair and $H_L^{(i)}$ is the local magnetic field "seen" by each metal-filled pore pair.

The local field $E_L^{(i)}$ is given by:

$$E_L^{(i)} = E + \frac{\hat{L}^{(i)} \cdot \vec{P}^{(i)}}{\epsilon_B},$$

where $\hat{L}^{(i)}$ is the depolarization tensor of the wire pair, $$L_{k,l}^{(i)} = 0, \text{ if } k \neq l, \sum_{j=1}^{3} \hat{L}_{j,j}^{(i)} = 1$$

in SI units. The polarizability of each metal-filled pore pair $\hat{\alpha}^{(i)}$ is a tensor, diagonalizable in the coordinate system with one axis coinciding with the wire direction. In this case it follows from the above considerations that the effective dielectric permittivity of the considered material is:

$$\hat{\epsilon}^{(eff)} = \epsilon_B \left[ \hat{I} + \sum_{i=1}^{N} \hat{A}^{(i)} \begin{pmatrix} \frac{N^{(i)} \alpha_1^{(i)}}{\epsilon_B - L_{11} N^{(i)} \alpha_1^{(i)}} & 0 & 0 \\ 0 & \frac{N^{(i)} \alpha_2^{(i)}}{\epsilon_B - L_{22} N^{(i)} \alpha_2^{(i)}} & 0 \\ 0 & 0 & \frac{N^{(i)} \alpha_3^{(i)}}{\epsilon_B - L_{33} N^{(i)} \alpha_3^{(i)}} \end{pmatrix} \hat{A}^{(i)-1} \right]$$

where $\hat{I}_{i,j} = \delta_{i,j}$, $\hat{A}^{(i)}$ is the coordinate rotation matrix of $i^{th}$ sublattice ($\phi, \psi$ and $\theta$ are Euler angles), and $\hat{A}^{(i)-1}$ is the inverse matrix of the coordinate rotation matrix of $i^{th}$ sublattice.

Similarly for the magnetic case, with introduction of the demagnetization tensor $\hat{K}^{(i)}$ and the magnetic susceptibility of wire pair $$\hat{\chi}^{(i)} = \begin{pmatrix} \chi_1^{(i)} & 0 & 0 \\ 0 & \chi_2^{(i)} & 0 \\ 0 & 0 & \chi_3^{(i)} \end{pmatrix},$$

the expression of the magnetic permeability of the composite medium is:

$$\hat{\mu}^{(\mathit{eff})} =$$

$$\hat{I} + \sum_{i=1}^{N} \hat{A}^{(i)} \begin{pmatrix} \dfrac{N^{(i)}\chi_{11}^{(i)}}{1 - K_{11}^{(i)}N^{(i)}\chi_{11}^{(i)}} & 0 & 0 \\ 0 & \dfrac{N^{(i)}\chi_{22}^{(i)}}{1 - K_{22}^{(i)}N^{(i)}\chi_{22}^{(i)}} & 0 \\ 0 & 0 & \dfrac{N^{(i)}\chi_{33}^{(i)}}{1 - K_{33}^{(i)}N^{(i)}\chi_{33}^{(i)}} \end{pmatrix} \hat{A}^{(i)-1}$$

For the case of the magnetic field H of the electromagnetic wave being perpendicular to the plane of the wire pairs and electric field E parallel to the wire axis, the approximate analytical formulas for the polarizability and susceptibility of the individual wire pairs, after [Podolskiy, V., et al., *J. Nonlinear Optical Physics & Materials*, (2002) 11 (1), 65-74], are:

$$\vec{m} = 2Hb_1^3 C_2 (kd)^2 \frac{\tan(gb_1) - gb_1}{(gb_1)^3} \vec{n}_1$$

$$\vec{p} = \frac{2}{3} b_1 b_2^2 f(\Delta) E \varepsilon_m \frac{1}{1 + f(\Delta)\varepsilon_m \left(\dfrac{b_1}{b_2}\right)\ln\left(1 + \dfrac{b_1}{b_2}\right)\cos\Omega} \vec{n}_2$$

Figure 4:
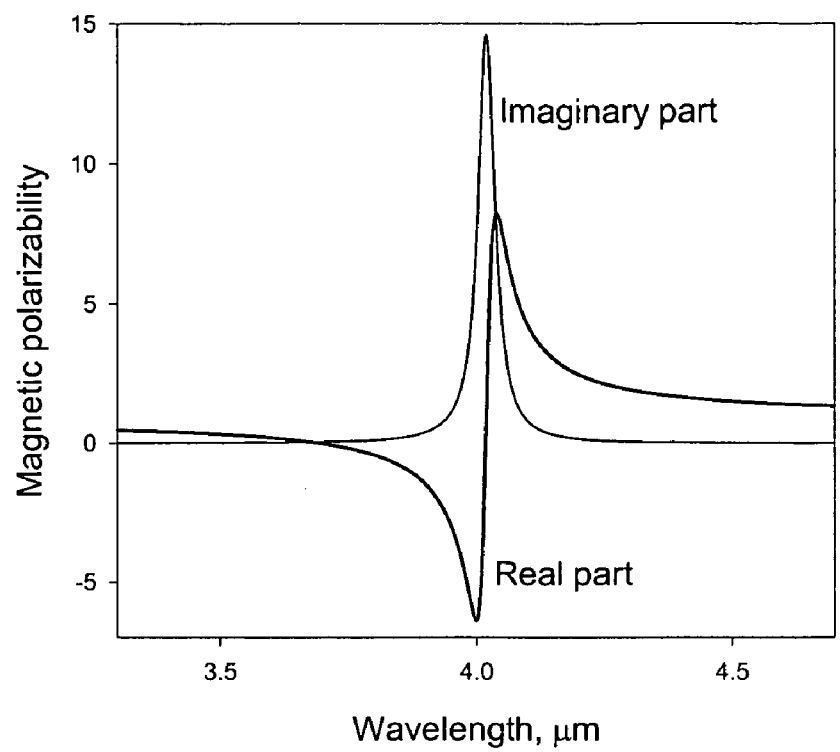
FIG. 4 gives illustrative the exemplary numerically calculated spectral dependence of the magnetic polarizability of an individual wire pair normalized by volume.

Where:

$$C_2 = \frac{1}{\ln\left(\dfrac{d}{b_2}\right)},$$

$$\Omega = (b_1 k)^2 \frac{\ln\left(\dfrac{b_1}{b_2}\right) + ikb_1}{\ln\left(1 + \dfrac{b_1}{b_2}\right)},$$

$$g = k \sqrt{1 + i\frac{1}{2\Delta^2 f(\Delta)\ln\left(\dfrac{d}{b_2}\right)}},$$

$$f(\Delta) = \frac{1 - i}{\Delta} \frac{J_1[(1+i)\Delta]}{J_0[(1+i)\Delta]},$$

$$\Delta = b_2 \sqrt{2\pi\sigma_m \frac{\omega}{c}},$$

d is the spacing between the wires, $2b_1$, is the length of the wires, $b_2$ is the radius of the wires, $\sigma_m$ is the electrical conductivity and k is the wave vector of the electromagnetic wave in the medium surrounding the wires. FIG. 4 gives illustrative exemplary spectral dependence of the magnetic polarizability of individual wire pair normalized by volume, numerically calculated according to the preceding formulas. The resonance is due to the coupling of the plasmon modes in two wires. The quality of this resonance (i.e., the narrowness and the amplitude of polarizability at slight detuning) depends on two main parameters: optical spacing between wires and on the quality of plasmon resonance in each wire separately (i.e., on the optical properties of wire material, spectral position of the resonance due to string dispersion of dielectric properties of metals (which is defined by the wire pair geometry), surrounding or host material and on wire structure). The important outcome of the preceding theory for NIR and/or opto-magnetic material is that the spectral position of the resonance in the magnetic susceptibility is roughly proportional to twice the length of the wires made of plasmon-supporting metal. Hence, for the NRI material of the present exemplary illustrative non-limiting implementation, in altering the design of the material to suit different intended purposes, "interruptions" of the plasmon support along the length of the pores could be implemented in order to limit the lengths of the plasmon-supporting wire pairs and provide a third dimension to the periodicity of the wire pairs. From the theoretical point of view, the best choice of material for such "interruptions" would be a low refractive index, transparent dielectric material. However, as will be apparent from this disclosure in relation to the third exemplary illustrative non-limiting implementation (related to manufacturing of such materials) such interruptions might be complicated from the fabrication point of view if electrical conductivity must be preserved for electroplating or similar purposes. Another solution is to alternate the high conductivity metal used to generate permeability resonance (Ag, Au, Cu or Al) with a low conductivity metal or alloy. In more detail, this method will be disclosed in relation to the third exemplary illustrative non-limiting implementation.

Figure 5A:
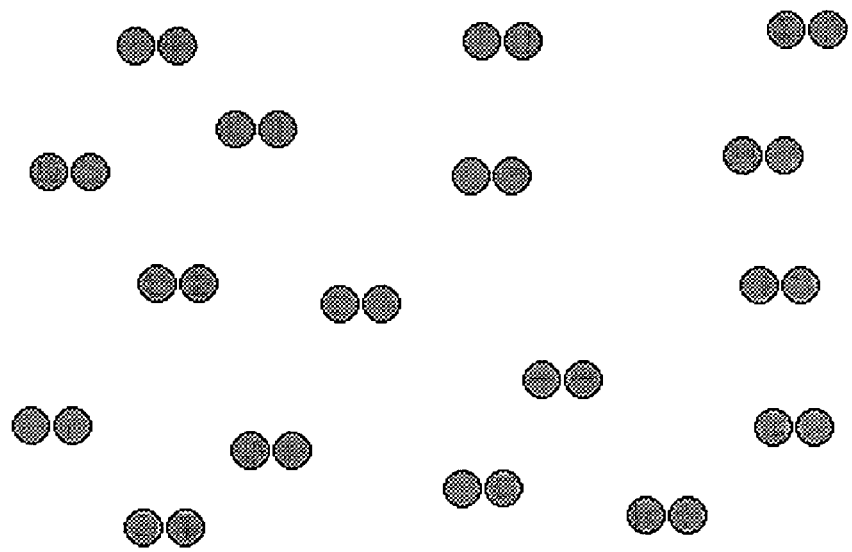
FIG. 5a shows the illustrative exemplary cross-sectional schematic drawing of a one-dimensional NRI material of the present exemplary illustrative non-limiting implementation.
Figure 6:
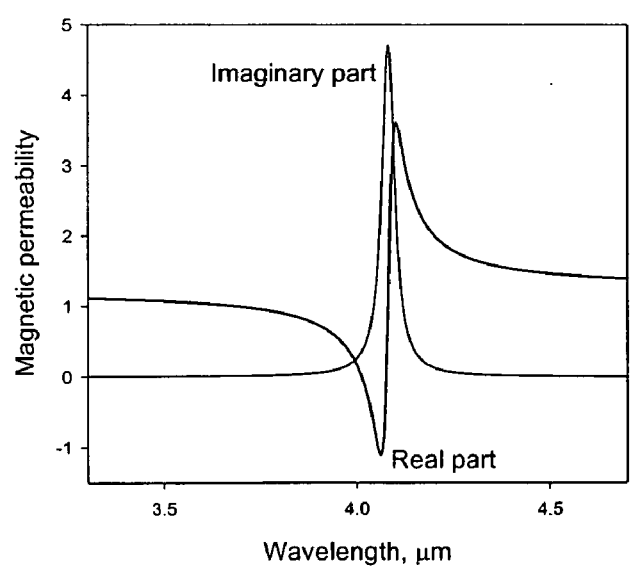
FIG. 6 gives illustrative exemplary numerically calculated spectral dependences of magnetic permeability of the material in FIG. 4a with a 15% volume fraction of metal composed on a single sublattice of wire pairs.

According to the first aspect of the first exemplary illustrative non-limiting implementation, the NRI and/or opto-magnetic material comprises a film having a thickness in the range of 1 μm to 1000 μm and consisting of a single lattice of metal wire pairs extended perpendicular to the film's plane. The schematic illustrative drawing of the cross-section of 1 D NRI and/or opto-magnetic material is presented in FIG. 5*a*. Such a material will have strongly anisotropic dielectric permittivity and magnetic permeability tensors at the wavelengths around resonances in the metal wire pairs. It can exhibit negative refractive index only for the electromagnetic waves propagating in the plane of the film in the direction perpendicular to the planes containing wire pairs and in a small cone of angles around this direction over some wavelength range, and for such a polarization of the electromagnetic wave that the electric field vector of said wave is parallel to the wire direction (i.e. perpendicular to the film plane, or TM polarization). This type of anisotropy belongs to the class of materials called "indefinite" materials (since different elements of dielectric permittivity and magnetic permeability tensors will have different signs). FIG. 6 gives a plot of the magnetic permeability of such a material calculated according to the previously discussed methods. For calculations, it was assumed that the material is composed of a single sublattice of wire pairs and contained 15 volume % of metal. It was further assumed that the magnetic field vector of the light wave was directed perpendicular to the planes of the long axis of the wire pairs. In the latter case, the effective medium theory presented above has been applied. One can see that indeed the negative values of the magnetic permeability can be obtained in metamaterial with realistic values of metal filling fractions (unlike the case considered in prior art [L. V. Panina et al., *Phys. Rev. B*, 66, p.

155411 (2002)], where the effect was degraded due to the random orientation of the wire pairs analyzed). It is also illustrated that the maximal value of the imaginary part of the magnetic permeability and the minimal value of the real part of the magnetic permeability are not coincident. In fact, the minimal value of the real part of the magnetic permeability of the material is located to one side of the peak of the imaginary part, meaning that, in principle, with the correct design of the material, negative values of the real part of the magnetic permeability can be achieved at wavelengths where the imaginary part of the magnetic permeability is relatively small. The spectral dependence of the dielectric permittivity of the composite also exhibits somewhat similar behavior—the minimal values of the real part are located to one side of the peak of the imaginary part.

Further, the diameters of the wires can be coherently modulated along the pore lengths so the effective refractive index of the film will be modulated across the film depth, as follows from the mathematical derivations provided previously. Quite interestingly, as follows from the formulas, shifting of the resonance peak with the change of the wire diameters will be a second order effect compared to changing the amplitude of the resonance. By this means, a waveguide structure can be created in the plane of the film that can have a number of important applications. Still further, such a material would exhibit values of magnetic permeability substantially different from unity in some part of the IR spectral range for all the electromagnetic waves propagating through said material in directions lying in the plane of the wire lengths and having such a polarization state that the magnetic field vector of the electromagnetic wave is directed perpendicular to the planes of wire pair. This would allow the material be used as an opto-magnetic composite for a number of directions, which is may find applications in light modulators and sensing.

Figure 5B:
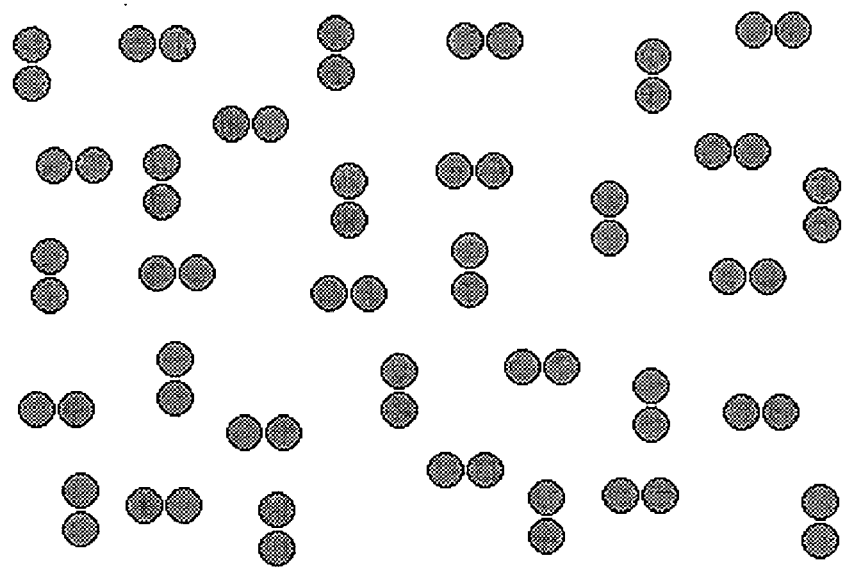
FIG. 5b shows the illustrative exemplary cross-sectional schematic drawing of a two-dimensional NRI material of the present exemplary illustrative non-limiting implementation.

According to the second aspect of the first exemplary illustrative non-limiting implementation, the NRI and/or opto-magnetic material comprises a film having a thickness in the range of 1 μm to 1000 μm, consisting of two lattices of metal wire pairs extended perpendicular to the film's plane and in addition with the planes of wire pairs in these lattices being perpendicular to each other. The illustrative schematic drawing of the cross-section of such a material is shown in FIG. 5b. In the illustrative case, the orientations of the wire pair lattices are shown to be perpendicular to each other. Such a geometry will provide equal values of two out of three diagonal elements in the effective magnetic permeability tensor of such a material in the coordinate system where such a tensor is diagonalizable in the case of equal population of both lattices. However, it should be noted that the present exemplary illustrative non-limiting implementation is not limited to the case of perpendicular orientations of the wire pairs and other orientations if desired by design can be used as well. Such a material will still have strongly anisotropic dielectric permittivity and magnetic permeability tensors at the wavelengths around resonances in metal wire pairs. However, the anisotropy will be substantially reduced with respect to the 1D material. It can exhibit negative refractive index for electromagnetic waves propagating in any direction in the plane of the film for such a polarization of said electromagnetic wave, so the electric field vector is directed perpendicular to the film plane (i.e., this is also the TM polarization, as in 1D case). This type of anisotropy also belongs to the class of materials called "indefinite" materials (since different elements of dielectric permittivity and magnetic permeability tensors will have different signs). However, the 2D material would exhibit two negative and one positive tensor elements in the coordinate system where dielectric permittivity and magnetic permeability tensors are diagonalizable (unlike the 1D case, which has one negative and two positive tensor elements). Further, the diameters of the wires can be coherently modulated in axial direction so the effective refractive index of the film will be modulated along the film depth. By this means, a waveguide structure can be created in the plane of the film, i.e., for such a waveguide mode, the refractive index of the core and/or cladding would be negative for any direction of propagation. Such a structure can have a number of important applications. Still further, such a material would exhibit values of magnetic permeability substantially different from unity in some part of the IR spectral range for all the electromagnetic waves propagating through said material in any directions having a polarization state such that the magnetic field vector of the electromagnetic wave is parallel to the plane of the film (i.e., TM, or p-polarized waves). Alternatively, such a material would exhibit values of magnetic permeability substantially different from unity in some part of the IR spectral range for all polarizations of electromagnetic waves incident within some cone of angles around the normal incidence direction. This would allow the material to be used as an opto-magnetic composite for a number of directions, which may find applications in light modulators and sensing of physical parameters.

Figure 7:
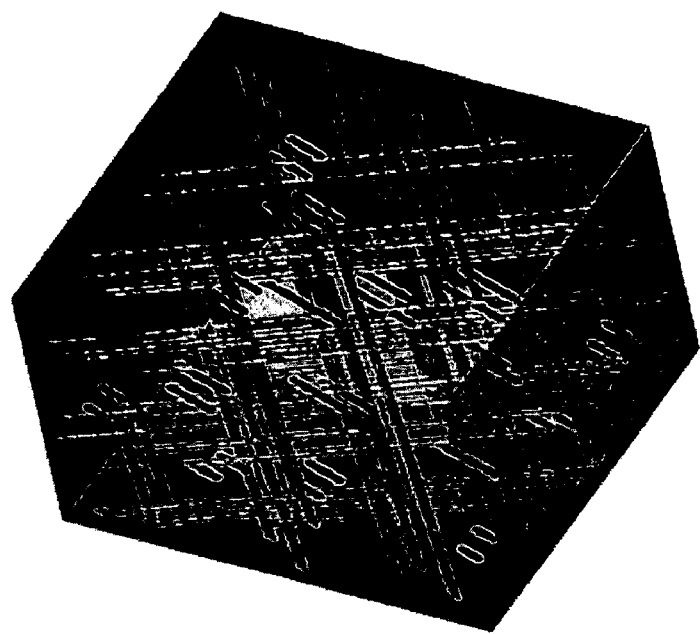
FIG. 7 is an illustrative diagrammatic view of an exemplary non-limiting illustrative implementation of an isotropic NRI and/or opto-magnetic material.

According to the third aspect of the first exemplary illustrative non-limiting implementation, the NRI and/or opto-magnetic material comprises a film having a thickness in the range of 1 μm to 1000 μm, consisting of three or more lattices of metal wire pairs, at least some of them extended at some angle with respect to the film's plane. The illustrative diagrammatic drawing of such a material for the case of three lattices is given in FIG. 7. Depending on configuration, such a material will either exhibit weak uniaxial or biaxial anisotropy of dielectric permittivity and magnetic permeability or will be completely isotropic at the wavelengths around resonances in the metal wire pairs. 3D material can exhibit a negative refractive index for electromagnetic waves propagating in any direction with respect to the film, for any polarization of said electromagnetic wave at least over some wavelength band within the IR spectral range. However, the values of the refractive index can be different in different propagation directions or for different polarizations, while still being all negative. Still further, such a material would exhibit values of magnetic permeability substantially different from unity in some part of the IR spectral range for all the polarizations of electromagnetic waves propagating through said material in any direction, i.e. such a material will serve as an isotropic or omnidirectional opto-magnetic material.

As an example of the anisotropy of such a material, consider the material with the following structure: The film material has a cubic crystallographic structure and the film plane is a (100) crystallographic plane. Further, the wire pairs are assembled into four sublattices aligned with four [111] crystallographic directions. The wires are of circular cross-sections. In this case, calculations according to the formalism provided previously show that both the dielectric permittivity and magnetic permeability tensors of the material will be isotropic. However, if the wires are of triangular shape, the material will exhibit uniaxial behavior.

Figure 8:
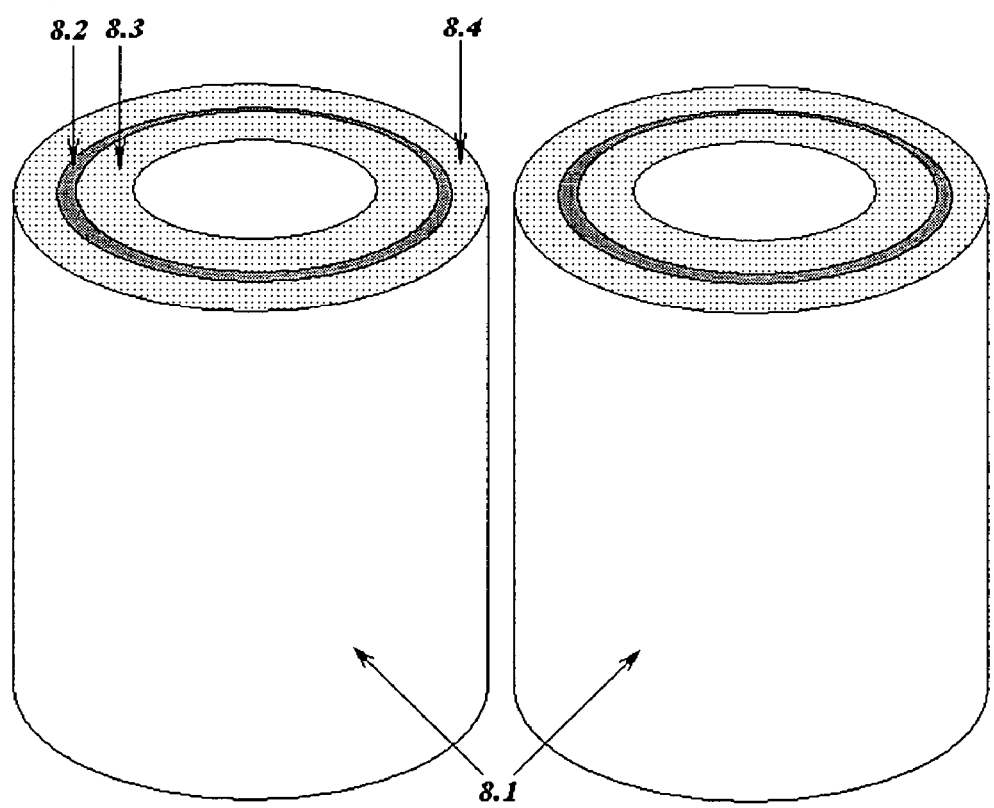
FIG. 8 is a diagrammatic perspective view of a non-limiting, illustrative exemplary design of a wire pair with wires comprised of a radial multilayer, metal-dielectric structure.

According to the second exemplary illustrative non-limiting implementation, the negative refractive index material of the first exemplary illustrative non-limiting implementation can be realized as an assembly of wire pair lattices, wherein said wires are composed of a radial multilayer metal-dielectric structure. The structure of each wire in such a material will be identical and composed of layers of metal(s) and dielectrics. The illustrative diagrammatic view of the material of the present aspect is shown in FIG. 8. In this nonlimiting illustrative drawing, the wire pair 8.1 consists of the wires made of three layers of different materials. For example, layers 8.4 and 8.3 can be layers of transparent dielectric material, while layer 8.2 can be a layer of metal. Alternatively, layers 8.4 and 8.3 can be metal layers, while layer 8.2 can be dielectric layer. The multilayer structure of the present aspect of the exemplary illustrative non-limiting implementation is by no means limited to the case illustrated in FIG. 8, and structures from as few as just two layers or with a number of layers considerably exceeding three can be employed. Such a structure can provide better engineering opportunities over the shape and spectral position of dielectric permittivity and magnetic permeability resonances by means of better control over the plasmon modes. Particularly, the quality of the resonances can be substantially improved by creating so-called antisymmetric plasmon modes in wires, known to provide lower losses and higher quality of resonances. This in turn will lead to the increase of the absolute value of electric polarizability and magnetic susceptibility of each wire pair and, through that, to higher absolute values of dielectric permittivity and magnetic permeability of the NRI and/or opto-magnetic material of the present exemplary illustrative non-limiting implementation. Such a wire structure would considerably improve the NRI and/or opto-magnetic material prior art designs as described in for example, in [Podolskiy, V., et al., *J. Nonlinear Optical Physics & Materials*, (2002) 11 (1), 65-74] and [L. V. Panina et al., *Phys. Rev. B*, 66, p. 155411 (2002)]. Further, said wire pairs can be embedded in the semiconductor or dielectric host. In such a case it is necessary that said semiconductor and/or dielectric material should be sufficiently transparent at the wavelengths of permittivity and permeability resonances of said wire pair structures. It is also desirable that the refractive index of said host material should be sufficiently low in order to be able to achieve the negative values of refractive index of the film. Alternatively, the host material can be a semiconductor or a material composed of semiconductor and dielectric materials, and a low enough refractive index of the composite can be achieved artificially by means of the modification of the material structure. Further, the semiconductor host material can be replaced entirely with a dielectric material by a progressive etch-and-fill technique, where the semiconductor is partially etched away from one side, the wires are fixed by applying a dielectric, and then the process is repeated from the other side.

According to the third exemplary illustrative non-limiting implementation, the method of fabrication of the NRI and/or opto-magnetic material of the first two exemplary implementations of the present exemplary illustrative non-limiting implementation is provided. According to one non-limiting illustrative exemplary arrangement, a 1D or 2D material can be fabricated from a semiconductor wafer by forming a porous semiconductor structure (in which pores are straight and non-branching) by means of electrochemical or photo-electrochemical etching techniques, followed by the filling of said pores with metal or with the coating of the pore walls by a radial, metal-dielectric multilayer. Pore cross sections are either modulated at least along part of the depths while other parts are left unmodulated, or the entire depths can be modulated. With such a method, NRI and/or opto-magnetic material not only can be fabricated for scientific research purposes but also can be fabricated relatively simply and inexpensively, which could expand the considerable commercial value.

Said metal wire dimensions and positions in the film will be defined by pore sizes and positions. Such a structure can be fabricated, for example, by forming the layer of porous semiconductor by means of electrochemical etching of a single crystal semiconductor wafer as deeply as necessary. Pores formed by such a process will serve as hosts for metal or metal-dielectric structures of said wires, while the semiconductor host will serve as the medium in which said wires are embedded, while providing transmission in the infrared spectrum. The previously described modulation of the cross sections of the wires can be achieved by means of modulating the pore diameters along their depths by modulating the electrochemical etching parameters during the electrochemical etching process. For example, the parameters available for modulation include the current density, illumination intensity and others known to those skilled in the art. Said semiconductor material can be silicon (P-type doped or N-type doped), gallium arsenide, indium phosphide, or any other material shown to form pores during electrochemical etching, in a suitable electrolyte and under suitable conditions. The pore filling or covering of the pore walls by metal or metal/dielectric multilayers can be achieved by electroplating techniques or by Chemical Vapor Deposition (preferably by Atomic Layer Deposition) techniques, or by any other deposition, sputtering, evaporation or growth process known to those skilled in the art.

This specification also discloses exemplary non-limiting illustrative methods for manufacturing NRI and/or opto-magnetic material. According to the one aspect of the present exemplary implementation, NRI and/or opto-magnetic material of the first exemplary illustrative non-limiting implementation can be produced by:

selecting a semiconductor wafer substrate (i.e. reference numeral 9 in FIG. 9) having a first and second surfaces wherein said first surface is substantially flat, producing etch starting points on the first surface of the semiconductor wafer, producing a porous layer in said wafer starting from the first surface, and filling the pores with at least one layer of appropriate metal.

The porous layer can be formed by means of electrochemical etching of said semiconductor wafer subtrate in acidic electrolyte. The etching method may include connecting the substrate as an electrode, contacting the first surface of the substrate with an electrolyte, setting a current density (or voltage) that will influence etching erosion, and continuing the etching to form said pores extending to a desired depth perpendicularly to said first surface (as would be desired for the 1D or 2D material of the first exemplary illustrative non-limiting implementation) or at some angle defined by the crystallographic orientation of the semiconductor wafer (as would be required for the 3D material of the first exemplary illustrative non-limiting implementation). Said semiconductor wafer substrate can be, but is not limited to, a silicon wafer. Etch starting points (commonly called "etch pits") can be formed in a form of depressions on the first surface of said wafer in order to control the locations of the pores to be formed in the electrochemical etching process. Said etch pits can be formed by means of the application of a photoresist layer on the first surface of the semiconductor wafer substrate, photolithographically defining the pattern of openings and chemically or reactively ion etching the etch pits through said openings. Alternatively, said etch pits can be formed by depositing (by means of chemical or physical vapor deposition, thermal oxidation, epitaxial growth, sol-gel coating or any other technique known to those skilled in the art) a material layer with different chemical properties than that of the substrate, applying a photoresist layer on the top of said material, photolithographically defining the pattern of openings in the photoresist layer, transferring said patterns into said layer by means of chemical or reactive ion etching and transforming the resultant pattern into a corresponding etch pit pattern by means of chemical or reactive ion etching. Said layer of material with different chemical properties than that of the substrate wafer substrate may then be removed by means of chemical etching, reactive ion etching or any other method known to those skilled in the art.

More specifically, said semiconductor wafer substrate can be an n-doped, <100> orientated silicon wafer. The electrolyte can be in this case an HF-based aqueous acidic electrolyte. Alternatively, the electrolyte can be an HF-based organic electrolyte. Alternatively, said semiconductor wafer substrate can be a p-doped, <100> orientated silicon wafer. The electrolyte in this case may be HF-based organic electrolyte. Said electrolyte may contain hydrofluoric acid in a range of 1% to 50%, but preferably 2 to 10% by volume. A second surface of the substrate wafer that lies opposite the first surface may be illuminated during electrochemical etching (which is required for n-type doped silicon wafers etching in order to obtain non-branching straight pores). In the latter case, it is also desired that the illumination wavelengths are either close to the semiconductor bandgap energy of the silicon or the minority carrier lifetime of the wafer is long enough to provide a sufficient density of conducting holes at the etching interface to suppress branching of the pores. The electrolyte may additionally contain a wetting agent, an oxidation agent, a hydrogen reducing agent (e.g., the latter selected from the group of chemicals consisting of mono-functional alkyl alcohols or tri-functional alkyl alcohols), a viscosity increasing agent, a conductivity-modifying agent, and/or other organic additives. Electrochemical process parameters such as current density, applied voltage, and illumination intensity can be kept constant during the pore formation process. Alternatively, said electrochemical process parameters can vary in a predetermined fashion during the pore growth process to provide the pores with desired modulation in cross-sections. As a further alternative, said semiconductor wafer substrate can be of material chosen from the full possible range of alloys and compounds of zinc, cadmium, mercury, silicon, germanium, tin, lead, aluminum, gallium, indium, bismuth, nitrogen, oxygen, phosphorus, arsenic, antimony, sulfur, selenium and tellurium. The electrolyte may be an acidic electrolyte with the acid suitably chosen for pore formation in the particular semiconductor material.

Figure 9:
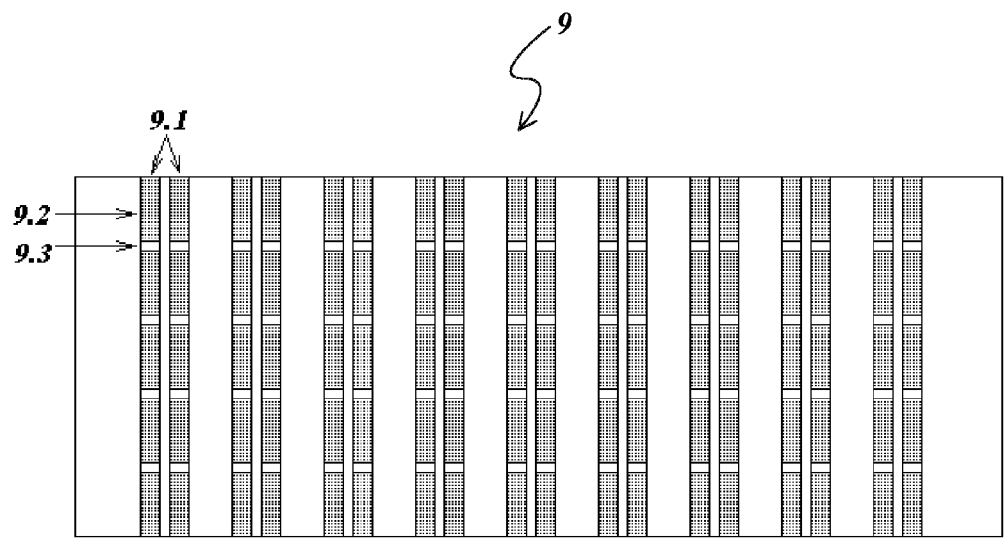
FIG. 9 is a diagrammatic cross sectional view of a non-limiting, illustrative exemplary design of an NRI and/or opto-magnetic material of the present exemplary illustrative non-limiting implementation comprising an axial multilayer with pore pairs filled with plasmon-mode-supporting metal separated by layers of an electrical conductor that does not support plasmon modes. Each plasmon-supporting segment is termed a wire.

Said filling of the pores with appropriate metal can be done by means of an electroplating process. It should be noted that an electroplating process can be chosen such that the metal axial multilayer (as schematically shown in FIG. 9, showing a wire pair 9.1 having plasmon-active material sections 9.2 and low conductive metal "separators" 9.3) can be formed by changing the composition of the electrolyte during the electroplating process and/or changing the electroplating process parameters, e.g. applied current density. The metal filling the pores can be Au, Ag, Al, Cu, Ta, Ti, Co, Ni, Fe, Pt or In or it can be an metal alloy of any combination of these metals. In an electroplating process, complete void-less filling the pores and formation of the metal axial multilayer is possible only if the pores are filled from the bottom up. This nonlimiting, illustrative method of NRI and/or opto-magnetic material fabrication is possible only if no insulating material or layer covers the pore walls. Alternatively, the pores can be filled by an electroless plating process, which may or may not include an activation step such as the application of Pd chloride. It should be noted that in electroplating process only axial metal multilayers can be formed while in the electroless plating process only radial metal multilayers can be formed. In this case, no metal "multilayer" formation is possible. Other metal and dielectric deposition processes (such as various modifications of Chemical Vapor Deposition technique) are also possible and may more easily deposit conducting and non-conducting multilayers. It should be also noted that after either the electroplating or electroless plating processes, some excessive metal can be formed on the first surface of the semiconductor wafer, which may degrade the performance of the as-fabricated NRI and/or opto-magnetic material. Said excessive metal can be removed from the first surface of the semiconductor wafer substrate by chemical-mechanical polishing techniques or any other removal techniques known to those skilled in the art.

According to a further illustrative non-limiting method of manufacturing, a NRI and/or opto-magnetic material of the first exemplary illustrative non-limiting implementation can be produced by:

selecting a semiconductor wafer substrate having first and second surfaces, wherein said first surface is substantially flat, producing etch starting points on the first surface of the semiconductor wafer substrate, producing a porous layer in said wafer starting from the first surface, removing the un-etched part of said wafer at the ends of the pores, and filling the pores with metal.

The porous layer can be formed as has been previously disclosed in relation to the illustrative methods of manufacturing an NRI and/or opto-magnetic material.

Removal of the unetched part of the wafer can be performed by means of grinding, polishing, chemical-mechanical polishing, chemical etching, reactive ion etching or any other method known to those skilled in the art.

Said filling of the pores with appropriate metal can be done by means of the electroplating process. It should be noted that, by means of an electroplating process, the metal multilayer can be formed by changing the composition of the electrolyte during the electroplating process and/or changing the electroplating process parameters, e.g. applied current density. The metal filling the pores can be Au, Ag, Al, Cu, Ta, Ti, Co, Ni, Fe, Pt or In, or it can be a metal alloy of any of these metals. In an electroplating process, complete, voidless filling of the pores and formation of a metal axial multilayer is possible only if the pores are filled from the bottom up (i.e. from one end of the pore). This nonlimiting illustrative method of NRI and/or opto-magnetic material fabrication is possible even if the pore walls are covered by insulating material, since the pores are open from both ends and the current can pass through the electrolyte that fills the pores during the plating process. Alternatively, the pores can be filled by an electroless plating process. In this case no metal "multilayer" formation is possible unless the plating solution is completely replace, which would be possible if only 2 or 3 layers were needed. Other metal deposition processes (such as various modifications of Chemical Vapor Deposition) are also possible. It should be also noted that after both the electroplating and electroless-plating processes, some excessive metal can be formed on the first and/or second surfaces of the semiconductor wafer that may degrade the performance of the as-fabricated NRI and/or opto-magnetic material. Said excessive metal can be removed from the first surface of the semiconductor wafer substrate by chemical-mechanical polishing techniques or any other removal technique known to those skilled in the art.

According to a further illustrative non-limiting method of manufacturing a NRI and/or opto-magnetic material of the second exemplary illustrative non-limiting implementation can be produced by:

selecting a semiconductor wafer substrate having first and second surfaces, wherein said first surface is substantially flat, producing etch starting points on the first surface of the semiconductor wafer substrate, producing a porous layer in said wafer starting from the first surface, coating the pore walls with metal-dielectric multilayer.

The porous layer can be formed by the illustrative methods herein disclosed for the manufacture of an NRI and/or opto-magnetic material.

Said coating of the pore walls with metal-dielectric multilayer structure can be done by means of the different variations of Chemical Vapor Deposition (CVD) techniques or by means of the combination of thermal oxidation with CVD techniques. Particularly, a combination of thermal oxidation with Metallo-Organic CVD (MOCVD) would be the technique of choice if the desired metal-dielectric multilayer should consist of just two layers, an insulating dielectric on the pore walls and a plasmon-supportive metal covering the dielectric. If more than two layers are required (such as dielectric-metal-dielectric, or an even more complex structure with several layers of metal and dielectric), the Atomic Layer Deposition (ALD) would be the best technique to be used since it is better suited for uniform, pinhole-free covering of high aspect ratio structures with excellent control over the each layer thickness ([M. Ritala and M. Leskela, in: H. S. Nalwa, (Ed), Handbook of Thin Film Materials, Academic Press, San Diego, 2001, Vol. 1, Chapter 2, p 103], [S. M. George, A. W. Ott and J. W. Klaus, J. Phys. Chem. 100 (1996) 13121], [O. Sneh, R. B. Clark-Phelps, A. R. Londergan, J. L. Winkler and T. E. Seidel, Thin Solid Films, 402/1-2 (2002) 248], [O. Sneh, Solid State Technology, November 2003, p. 22]).

According to another illustrative non-limiting method of manufacture, an NRI and/or opto-magnetic material of the second exemplary illustrative non-limiting implementation can be produced by:

selecting a semiconductor wafer substrate having first and second surfaces, wherein said first surface is substantially flat, producing etch starting points on the first surface of the semiconductor wafer substrate, producing a porous layer in said wafer starting from the first surface, removing the un-etched part of said wafer at the ends of the pores, and coating the pore walls with at least one metal-dielectric multilayer.

All the fabrication steps can be performed as was described in relation to given previously illustrative methods of manufacturing a NRI and/or opto-magnetic material. However, such a sequence of the steps might be advantageous for the case of the NRI and/or opto-magnetic material with high number of layers in "multilayer" coating the pore walls since having pores open on both sides making gas flow (i.e. reagent flow in CVD technique) more simple. In the case of MOCVD used as a deposition technique this would open the prospects for fabricating deeper pore structures (i.e. thicker films of NRI and/or opto-magnetic material), while in the case of ALD it would shorten the processing time and will potentially lower consumption of chemicals.

Figure 10:
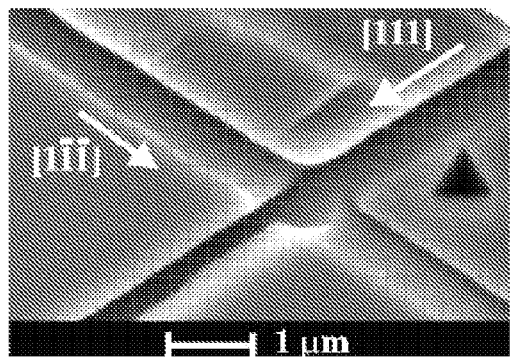
FIG. 10 is an illustrative SEM image showing cleaved edge of an anodically etched n-GaAs wafer having (100) orientation.
Figure 11:
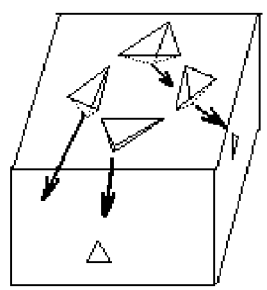
FIG. 11 is an exemplary schematic view of the surface of a GaAs wafer with etch pits illustrating pore growth direction control by means of the etch pit orientation and shape.

As a nonlimiting example of semiconductor material that can provide the pore structure appropriate for the realization of 3D NRI and/or opto-magnetic material, GaAs can be considered. Such a material can be etched such that four lattices of crystallographically-oriented pores (naturally grown along four (111) directions) are formed. Four possible orientations of triangles correspond to four possible pore growth directions in (100) GaAs (see FIG. 10). The pores exhibit triangular shape and theory predicts that NRI and/or opto-magnetic material based on porous GaAs will exhibit very small uniaxial anisotropy. In this case, special precautions should be taken to control the direction of the pore growth from each of the etch pits on the surface of the (100) GaAs wafer. This problem may be solved by producing etch-pits in the form of triangles, as shown schematically in FIG. 11.

Figure 12A:
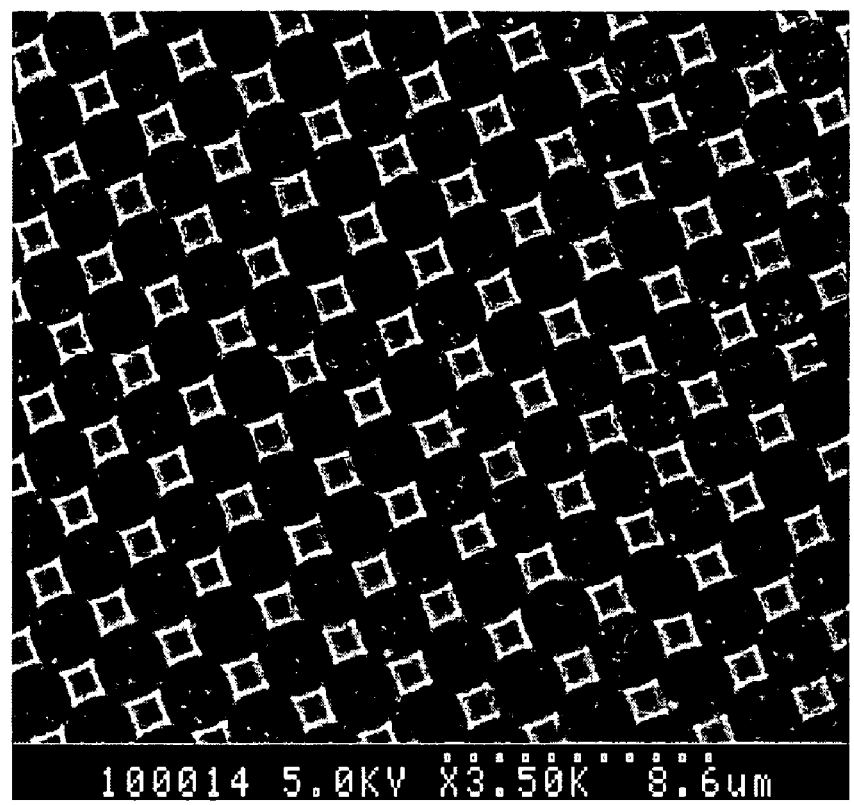
FIG. 12a-12b are illustrative exemplary non-limiting SEM images of a cross-section perpendicular to the pore axes and parallel to them, respectively, of an porous semiconductor wafer having a pores completely filling by copper by the electroplating process.
Figure 12B:
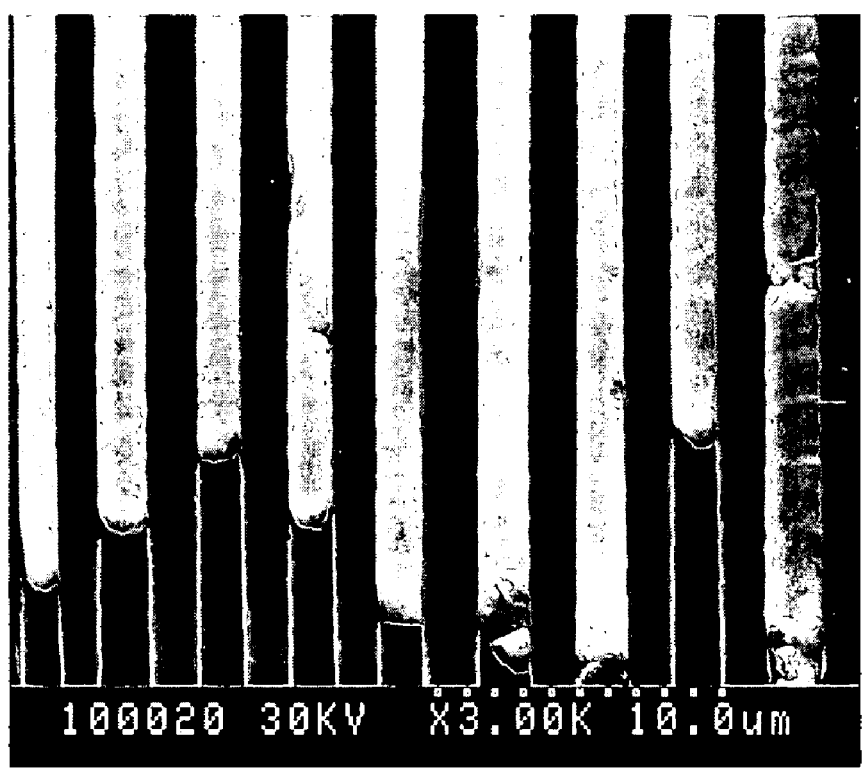

FIG. 12 shows illustrative exemplary non-limiting SEM images of (a) a cross-section perpendicular to the pore axes and (b) parallel to them, respectively, of an porous semiconductor wafer substrate having a pores completely filling by copper by the electroplating process.

While the technology herein has been described in connection with exemplary illustrative non-limiting embodiments, the invention is not to be limited by the disclosure. The invention is intended to be defined by the claims and to cover all corresponding and equivalent arrangements whether or not specifically disclosed herein.

I claim:

1. An opto-magnetic material functional over at least one predetermined spectral wavelength band within the visible-to-far infrared range, said material comprising:

a substrate; and plural, substantially uniform wires defined at least partially through said substrate, said wires assembled in pairs to provide wire pairs such that the wires in each said wire pair have substantially the same dimensions, structure and orientation, the wires in said wire pairs each having a length and a cross-sectional size, distance between the wires in each said wire pair being smaller than the wire length but larger than the wire cross-sectional size;

said wire pairs assembled in at least one sublattice such that all of said wires of the wire pairs in said at least one sublattice are substantially parallel to each other and planes containing the wires in each said wire pair are also substantially parallel within said at least one sublattice;

said wire pairs assembled in different sublattices having wire directions and/or wire planes that are not parallel;

wherein said wires in said wire pairs assembled in the at least one sublattice contain at least one layer of metal supporting at least one plasmon mode.

2. An opto-magnetic material of claim 1 wherein said substrate comprises a host wafer of porous semiconductor material, said semiconductor material serving as a host for forming and enclosing said wires of the wire pairs in said at least one sublattice.

3. An opto-magnetic material of claim 2 wherein said porous semiconductor material is chosen from a set of alloys and compounds of zinc, cadmium, mercury, silicon, germanium, tin, lead, aluminum, gallium, indium, bismuth, nitrogen, oxygen, phosphorus, arsenic, antimony, sulfur, selenium and tellurium.

4. An opto-magnetic material of claim 2 wherein said porous semiconductor material chosen from a group consisting of macroporous silicon, porous indium phosphide and porous gallium arsenide.

5. An opto-magnetic material of claim 1, wherein the substrate has a thickness of from about 1 to about 5000 times a characteristic lateral dimension of said wires in said wire pairs in said at least one sublattice.

6. An opto-magnetic material of claim 1 wherein said wire pairs in said at least one sublattice are arranged in a single sublattice and are extended perpendicular to a surface of said substrate.

7. An opto-magnetic material of claim 1 wherein said wire pairs in said at least one sublattice are arranged in two sublattices and are extended perpendicular to a surface of said substrate in each of the two sublattices.

8. An opto-magnetic material of claim 1 wherein said wire pairs in said at least one sublattice are arranged in a three or more sublattices and the wires in at least one of said three or more sublattices are extended at some angle with respect to a direction normal to a surface of said substrate.

9. An opto-magnetic material of claim 1 wherein said material exhibits negative values of magnetic permeability and dielectric permittivity at least over some wavelength range for electromagnetic waves propagating at least one direction therethrough and having at least some polarization state.

10. An opto-magnetic material of claim 1 wherein said wire pairs in said at least one sublattice are separated from each other by distances within a range of between two and twenty distances between the wires in each of said wire pairs.

11. An opto-magnetic material of claim 1 wherein said at least one layer of metal is chosen from a group consisting of Au, Ag, Al, Cu, Co, Ni, Fe, In, Sn, Pt, Pd, Rh, Ru, Ta, Ti.

12. An opto-magnetic material of claim 1 wherein said at least one layer of metal is an alloy chosen from a set of alloys and compounds of Fe, Ni, Co, B, Zn, Cd, Hg, Si, Ge, Sn, Sb, Al, Ga, In, Bi, N, On, P, Ar, At, S, Se and Te.

13. An opto-magnetic material of claim 1 wherein a composition of the wires in said wire pairs in said at least one sublattice changes at least at one point along the wire length.

14. An opto-magnetic material of claim 1 wherein a dielectric layer is disposed between said at least one layer of metal comprising the wires and the substrate.

15. An opto-magnetic material of claim 1 wherein said wires in said wire pairs in said at least one sublattice consist of at least one dielectric/metal/dielectric structure such that antisymmetric plasmon modes are supported at least over some wavelengths within an operational wavelength range of said opto-magnetic material.

16. An opto-magnetic material of claim 1 further including dielectrics incorporated in said wire pairs in said at least one sublattice, said dielectrics being substantially transparent in an operational wavelength range of said opto-magnetic material.

17. An opto-magnetic material of claim 15, wherein each of said at least one dielectric/metal/dielectric structure incorporated in said wires is a material selected from a group consisting of oxides, nitrides, oxynitrides and fluorides of metals and semiconductors.

18. An opto-magnetic material of claim 1, wherein said substrate defines at least one wall having pores defined therein, and said at least one layer of metal comprises more than two layers of metal extending radially from the wall having pores, each separated by at least one layer of dielectric material, and wherein each of said at least one layer of metal supporting said at least one plasmon mode supports complex plasmon modes at least over some wavelengths within an operation wavelength range of said opto-magnetic material.

19. An opto-magnetic material of claim 1, wherein said wire pairs in said at least one sublattice are spatially ordered into a predetermined pattern having predetermined symmetry.

20. An opto-magnetic material of claim 1, wherein said wires within the wire pairs in said at least one sublattice are made to exhibit a modulated lateral cross section over at least some part of an axial length thereof.

21. An optical imaging device including the opto-magnetic material of claim 1, wherein said opto-magnetic material is used in said optical imaging device as a beam shaping, focusing and/or correction component.

* * * * *